United States Patent [19]

Salberta

[11] 4,132,352
[45] Jan. 2, 1979

[54] INFORMATION READER TIMING CIRCUIT
[75] Inventor: Richard A. Salberta, Titusville, N.J.
[73] Assignee: Taurus Corporation, Lambertville, N.J.
[21] Appl. No.: 790,899
[22] Filed: Apr. 26, 1977
[51] Int. Cl.² .......................... G06K 7/10; G06K 9/04
[52] U.S. Cl. ............................... 235/456; 340/146.3 K
[58] Field of Search ..................... 250/566, 568, 569; 360/24, 88, 91; 235/61.11 E, 61.11 D, 61.7 B, 61.9 R, 61.12 N, 61.12 M; 340/146.3 R, 146.3 K, 149 A, 152 R

[56] References Cited
U.S. PATENT DOCUMENTS

| | | | |
|---|---|---|---|
| 3,106,706 | 10/1963 | Kolanowski | 340/146.3 K |
| 3,409,760 | 11/1968 | Hamisch | 235/61.12 N |
| 3,553,437 | 1/1971 | Boothroyd | 235/61.11 E |
| 3,663,800 | 5/1972 | Myer | 235/61.11 E |
| 3,683,413 | 8/1972 | Schlaepfer | 235/61.12 M |
| 3,737,629 | 6/1973 | See | 235/61.11 E |
| 3,745,310 | 7/1973 | Laborde | 235/61.11 D |
| 3,753,255 | 8/1973 | Di Veto | 235/61.11 D |

Primary Examiner—Robert M. Kilgore
Attorney, Agent, or Firm—Carella, Bain, Gilfillan & Rhodes

[57] ABSTRACT

Apparatus is presented for reading information characters present on a medium by scanning successive columns or lines. To prevent the occurrence of skewing of output signals when present among the responses of individual detectors to information characters, a circuit is utilized to provide a read or strobe pulse after the data registers associated with each detector are reset. The circuit improves the accuracy of the output signals with a minimum of components.

7 Claims, 4 Drawing Figures

INFORMATION READER TIMING CIRCUIT

BACKGROUND OF THE INVENTION

This invention relates to means for providing output signals indicative of information or data present on a medium and, more particularly, to circuitry for improving the reliability and accuracy of the output signals produced by such means.

With the advent of computers and various forms of data communication, coded information is placed on media such as tapes, badges or cards. This information is in the form of information characters located at sites of a grid or matrix selected in accordance with a code indicative of the particular information or data being recorded. The information characters are usually binary and have two states. Therefore, the medium may be altered at the locations of selected sites to indicate one state while the remaining unaltered sites represent the other state. There are many forms of information characters such as, for example, printed ink marks, magnetic domains, or punched holes.

Although these information characters may be read with the medium stationary by employing as many detectors as there are sites, dynamic reading with the medium moving past the detectors or vice versa offers the advantage of successive operation of a fewer number of detectors. For instance, when the sites form a matrix with columns and rows, only as many detectors as there are rows may read successive columns serially to obtain all the information on the medium. Conversely, a number of detectors corresponding to the number of information sites in a column may obtain all the information by successive reading of rows serially. In dynamic or successive operation of the detectors, mechanical arrangements often provide the relative motion between the medium and the detectors which is also known as scanning. The scanning motion may also be provided by manually moving the medium by an individual who is also operating the information reader.

In either case and particularly in the latter, a phenomenon known as skewing occurs. Skewing is the uneven and sometimes sporadic, at its worst, activation of the individual detectors as opposed to the simultaneous operation of the plurality of detectors in indicating the presence of information characters in a given column or row. Skewing is due to a number of factors some of which are irregularities in the information characters, different sensitivities of the detectors, variations in the tolerances of the mechanical arrangement to guide and constrain the motion, and variations in the dimensions of media, e.g., cards, badges or tapes. Uneven or irregular movement, such as that produced by manual sliding, severely aggravates the problem of skewing. Since all of the detectors must provide a correct and stable output signal at a predetermined point in time, usually indicated by a read or strobe pulse, to provide useful information for associated circuits and devices, skewing of output signals in accordance with the operation of associated detectors must not be tolerated.

SUMMARY OF THE INVENTION

An object of this invention is to provide stable and accurate output signals indicative of the presence of information characters associated with a plurality of detectors subject to the occurrence of skewing.

A related object of the invention is to provide during a common interval a stable output signal derived from a plurality of detectors when skewing is so severe as to produce very narrow intervals of nonactivation of the plurality of detectors associated with the spacing between rows or columns of information characters on a medium.

The invention takes the form of a linear array of detectors scanning information characters at sites on a medium that are successively read by the detectors in lines corresponding to the orientation of the linear array. A memory stores the output signals produced by each detector and indicates same. A logical device is responsive to the start of the first output signal from a detector and the termination of the last output signal and produces a second signal having a duration corresponding to the interval between the two responses. The memory is reset or cleared in response to the beginning of the second signal while another output signal is produced at the end of the second signal to indicate that the memory contains outputs of all detectors each responsive to one of the information characters in the line just being read.

In some of the further aspects of the invention, the lines that correspond to the orientation of linear array of detectors are columns. A gate is located to receive the second signal as an input and the other output signal is the other input. The output of the gate is used to delay the resetting of the memory to ensure that the clearing of the memory occurs after the other output signal. The number of the plurality of detectors corresponds to the number of information characters and sites in a column. An OR gate having a variable input for each one of the detectors is the logic device. The reset signal and the other output or strobe signal are produced by edge-triggered monostable multivibrators.

BRIEF DESCRIPTION OF THE DRAWING

A more complete understanding of this invention including additional objects, features and advantages thereof will be more readily appreciated and better understood by reference to the following detailed descripiton which should be considered in conjunction with the accompanying drawing in which.

DETAILED DESCRIPTION

Figure 1:
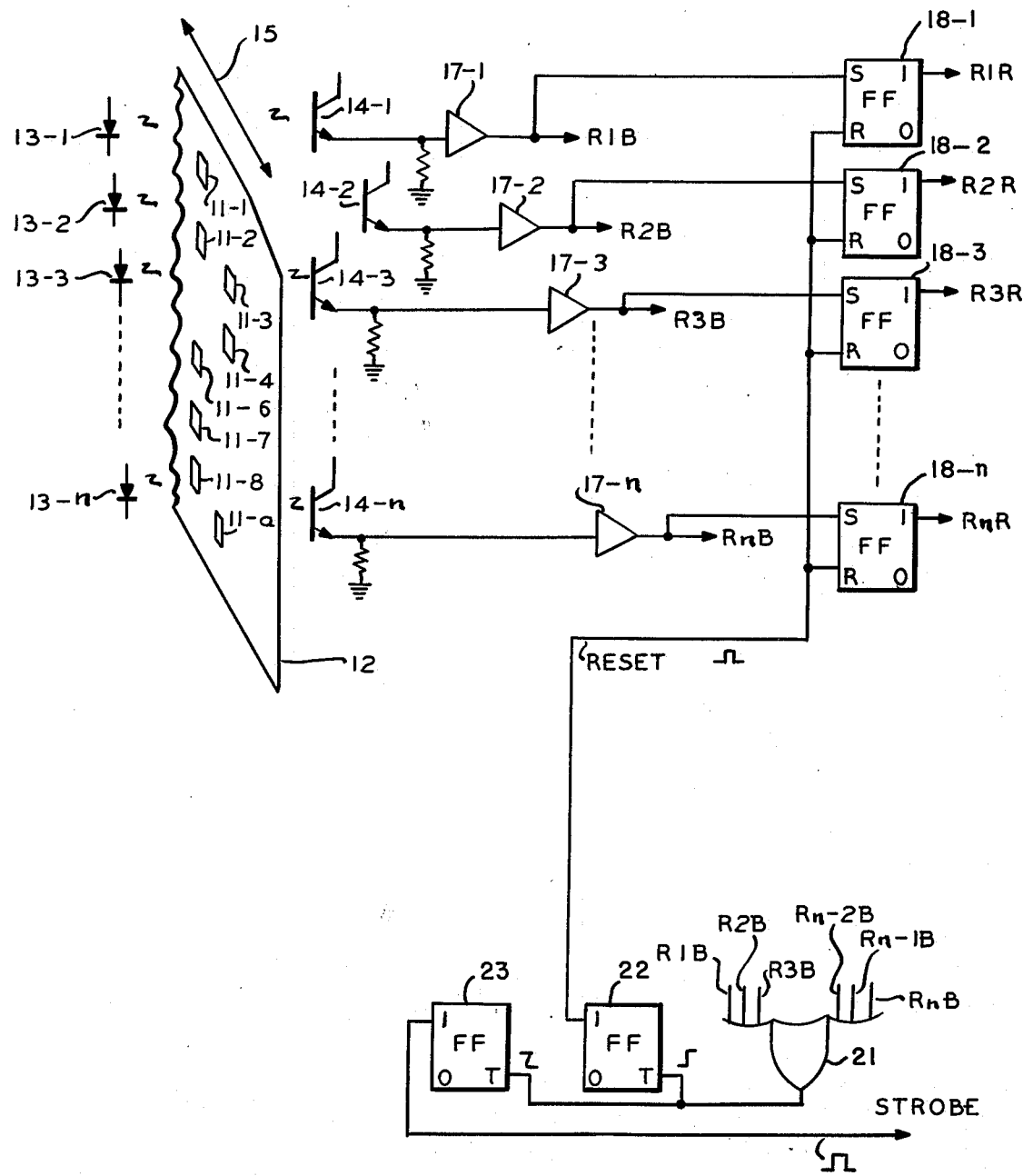
FIG. 1 is a diagram of an overall arrangement for providing output signals indicative of information characters.

In FIG. 1, a medium including a predetermined array of selected punched holes 11-a herein depicted as tabulating card 12, is scanned by moving same through a reading position. The reading position includes a plurality of radiators, such as the light emitting diodes 13-l through 13-n, each respectively associated with one of a plurality of sensors or detectors 14-l through 14-n. Although FIG. 1 depicts optoelectronic devices such as phototransistors for the sensors, other electrical devices including electro-mechanical devices capable of producing the appropriate signals may be used to detect the presence of holes. When card 12 is moved along the directional orientation indicated by arrow 15, the light emitted by diodes 13-n is absorbed by respective sensors, or detectors, 14-n in accordance with the coded patterns of punched holes in each of the vertical columns on card 12. Of course, these selected holes are indicative of information or data to be transformed into useful and convenient electrical signals. As light passes through a punched hole and is absorbed by one of the phototransistors 14-n, that phototransistor becomes conductive and applies a high level input signal to its associated one of the plurality of buffering amplifiers 17-n. That amplifier will produce a high level output which will place its associated one of the plurality of flip-flops 18-n in the set state. The associated one of flip-flops 18-n are placed in the set state to serve as a temporary memory or data output register. The set states will be maintained by each flip-flop after the intitiating light beam is blocked and the accompanying low level of its appropriate amplifier switches to a low level signal.

In order to appreciate the foregoing, the operation of OR gate 21 and flip-flop 22 will be considered. The outputs of amplifiers 17-n are each applied to gate 21. Accordingly, gate 21 will produce a high level output for the interval beginning with the operation of the first phototransistor that becomes conductive and ending with the last phototransistor to become nonconductive. In other words, a high output is produced by gate 21 for the duration of the reading interval of each column of punched holes in card 12. The occurrence of the initial positive transition in the output of gate 21, switches the "1" output of flip-flop 22 to a high level signal which forces all of flip-flops 18-n to the reset state. This reset pulse overrides any set outputs or high levels produced by amplifiers 17-n. On the other hand, a negative transition from gate 21 will switch the "0" output of strobe flip-flop 23 from a low to a high level signal. Both flip-flop 22 and 23 are known commonly to those skilled in the art as edge triggered monostable multivibrators and produce pulses of predetermined durations when triggered. This strobe or read pulse is used as a signal to indicate that the outputs of each of flip-flops 18-n accurately indicates the presence or absence of a punched hole of its associated row in the vertical column that has been just read by the arrangement of FIG. 1. This reading mode is called column serial row parallel. Of course, those skilled in the art may desire to change the orientation the plurality of sensors 14-n to utilize the complementary reading mode of row serial column parallel. Since there are usually a smaller number of rows than columns, the former mode has the advantage of requiring less sensors and associated apparatus.

Figure 2:
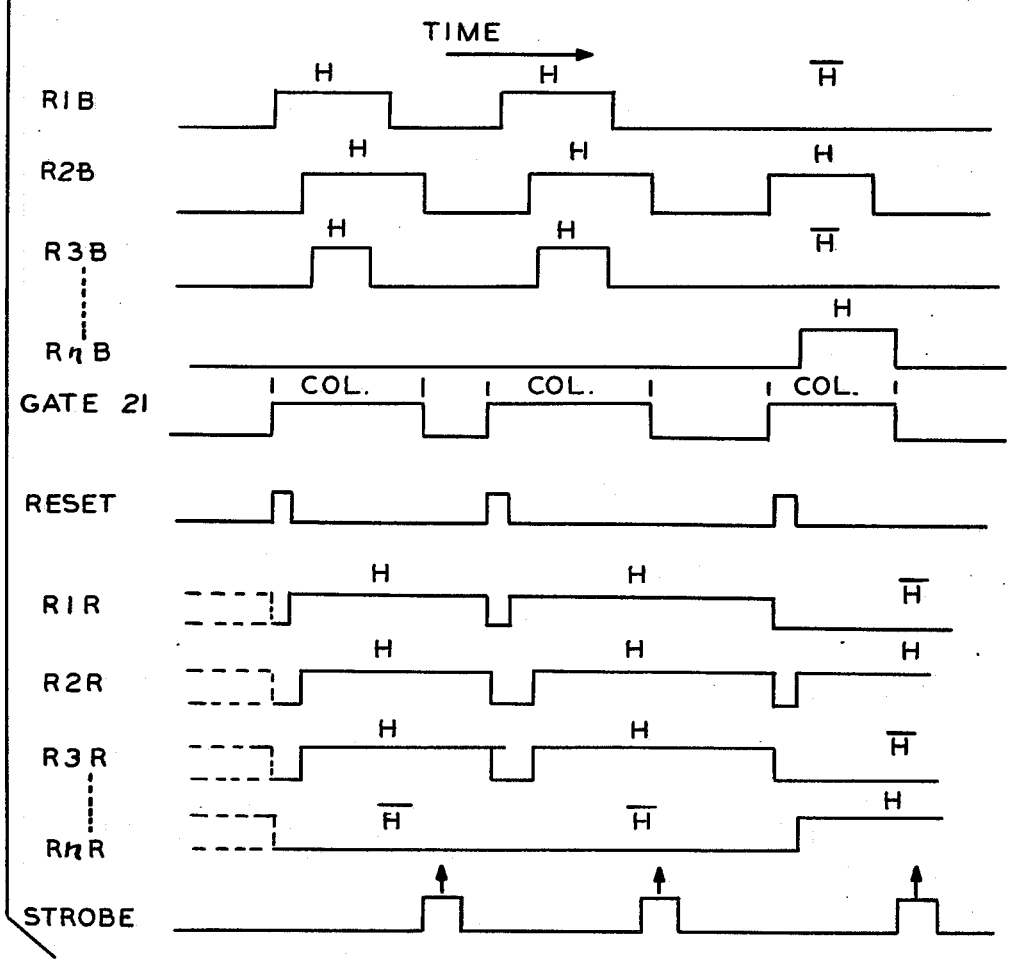
FIG. 2 is a waveform diagram that illustrates the signals produced by the arrangement of FIG. 1.

FIG. 2. utilizes waveforms to illustrate the operation of the arrangement of FIG. 1. Waveforms R1B through RnB respectively represent the outputs of amplifiers 17-l through 17-a. This produces the response of gate 21 which is depicted by its output shown in FIG. 2. The next waveform below represents the reset pulses produced by reset flip-flop 22. The next group of waveforms R1R through RnR respectively illustrate the output responses of flip-flops 18-l through 18-n which collectively serve as a data register. Finally, the remaining waveform in FIG. 2 represents the reading pulses produced by strobe flip-flop 23.

Overall FIG. 2 illustrates the operation of the arrangement of FIG. 1 for three successive columns of card 12. The letter H indicates the presence of a punched hole while $\overline{H}$ indicates absence of a hole. FIG. 2 also illustrates reliable operation of the arrangement of FIG. 1 in the presence of skewing as evidenced by the nonsychronized responses of sensors both from the start and at the end of hole detection.

Figure 3:
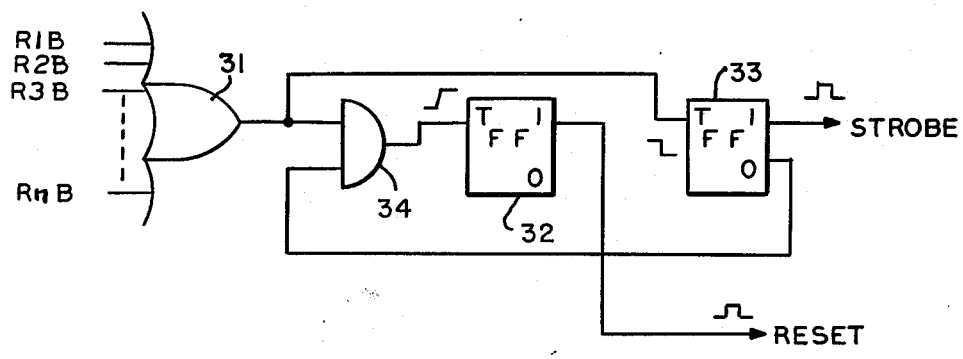
FIG. 3 is a diagram of an advantageous alternative of the portion of FIG. 1 that generates the reset and strobe signals.

FIG. 3 is a diagram of an alternate arrangement which is desirable under certain circumstances. Namely, cases wherein the reset and strobe pulses have a tendency to overlap. Although a number of causes may produce this overlap, typical causes are closely spaced columns or fast scanning rates wherein the skewing phenomenon also exists. The effect of which is that the column read pulses of OR gate 21 almost overlap.

Figure 4:
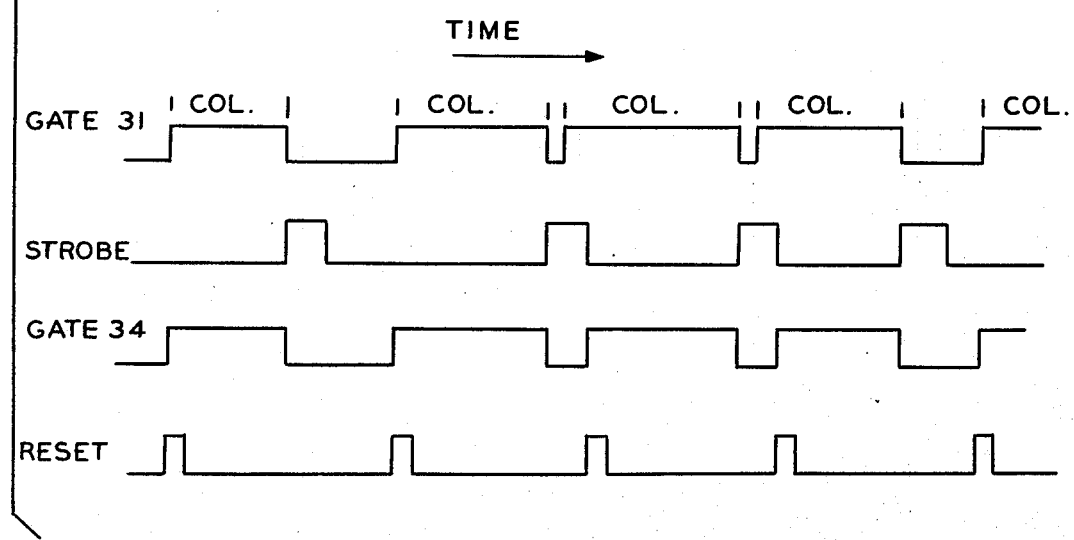
FIG. 4 is a diagram of waveforms that depict the operation of the arrangement of FIG. 3.

In FIG. 3, OR gate 31 receives signals from buffering amplifiers 18-n and produces a high output for the duration of a column reading interval. FIG. 4 illustrates a typical output waveform produced by gate 31. It should be observed that the spacing between the column reading pulses produced by gate 31 is not uniform. In addition to reset and strobe flip-flops 32 and 33, AND gate 34 is connected between gate 31 and flip-flop 32. Gate 34 serves to delay the triggering of flip-flop 32 when the resent pulse and strobe pulse would normally have some duration of time in common. More specifically, reset flip-flop will now be triggered by the trailing edge of the strobe pulse when the strobe pulse and the output pulse produced by gate 31 overlap.

FIG. 4 illustrates in addition to the output of gate 31, the output of strobe flip-flop 33, the output of gate 34, and the output of reset flip-flop 32. This illustrates that the circuit of FIG. 3 operates so that the reset and strobe pulses will not overlap, and also has the advantage of producing a strobe pulse of normal duration to allow correct reading of information from card 12.

Although the circuitry has been disclosed in the context of an illustrative tabulating card reader, it should be stressed that the inventive reading circuit is not limited to this application. For example, other reading applications may include reading of tapes, credit cards, badges among numerous other applications wherein the inventive circuit may be used to advantage. Also the circuitry herein presented as a specific embodiment is only intended to be illustrative. Other optoelectronic devices may be utilized, for example such as Darlington optotransistors which have sufficient gain to eliminate the necessity of buffering amplifiers 18-n. Also NAND gates may be cross-coupled to provide the data register function instead of the RS flip-flops shown herein. Of course, those skilled in the art may desire to rearrange the logic to utilize internal and output signals of appropriate polarities for their specific embodiment and application. It is to be understood that such modifications in form and detail may be made therein without departing from the spirit and scope of the invention.

What is claimed is:

1. Apparatus for providing signals indicative of information characters present on a medium being scanned in a predetermined direction, each information character is located on said medium at one of a plurality of preselected sites forming a matrix wherein the positions of the sites are defined by first lines oriented in a first direction intersected by second lines oriented in a second direction, said apparatus comprising:

detecting means for producing a plurality of first output signals, said detecting means comprising a plurality of detectors arranged in a linear array each producing one of said first output signals from information characters in a predetermined line corresponding to the orientation of said linear array, said detecting means further comprising memory means including only a single array of memory elements for storing each one of said first outputs and for indicating same, logic means responsive to the start of the first one of said first outputs that occur before the other of said first outputs and responsive to the termination of the last of said first outputs for providing a second signal having a duration corresponding to the interval between the two responses, resetting means responsive to the beginning of said second signal for clearing the content of said memory means, and output means responsive to the end of said second signal providing a strobe signal to indicate that said memory means has stored therein the outputs of all detectors each responsive to one of the information characters in said predetermined line.

2. Apparatus according to claim 1 wherein said first lines are columns and the orientation of said linear array corresponds to the columns.

3. Apparatus according to claim 2 further comprising gating means having said second signal as one input and providing an output for said resetting means, the other input of said gating means connected to receive the strobe signal for delaying the response of said resetting means until the termination of the strobe signal to ensure that the clearing of said memory means occurs after the termination of the strobe signal.

4. Apparatus according to claim 3 wherein the number of the plurality of the detectors corresponds to the number of information characters and sites in a column.

5. Apparatus according to claim 4 wherein said logic means is an OR gate having a number of variable inputs each connected to receive one of the first output signals.

6. Apparatus according to claim 5 wherein said resetting means comprises a first monostable multivibrator and said output means comprises another monostable multivibrator triggered on the opposite plurality of said first multivibrator and both of said multivibrator produce outputs of a predetermined duration.

7. Apparatus according to claim 6 wherein the information characters are binary having first states and second states wherein one state is indicated by apertures at selected ones of the sites while the other state is indicated by the absence of apertures at the remaining ones of the sites and the detectors each comprise a phototransistor and associated amplifying means for producing said first outputs.

* * * * *